June 17, 1930.  F. H. VAN HOUTEN  1,764,586
DOUGH DIVIDER AND ROUNDER
Filed June 4, 1929  3 Sheets-Sheet 1

Inventor
Frank H. Van Houten,
By
His Attorneys

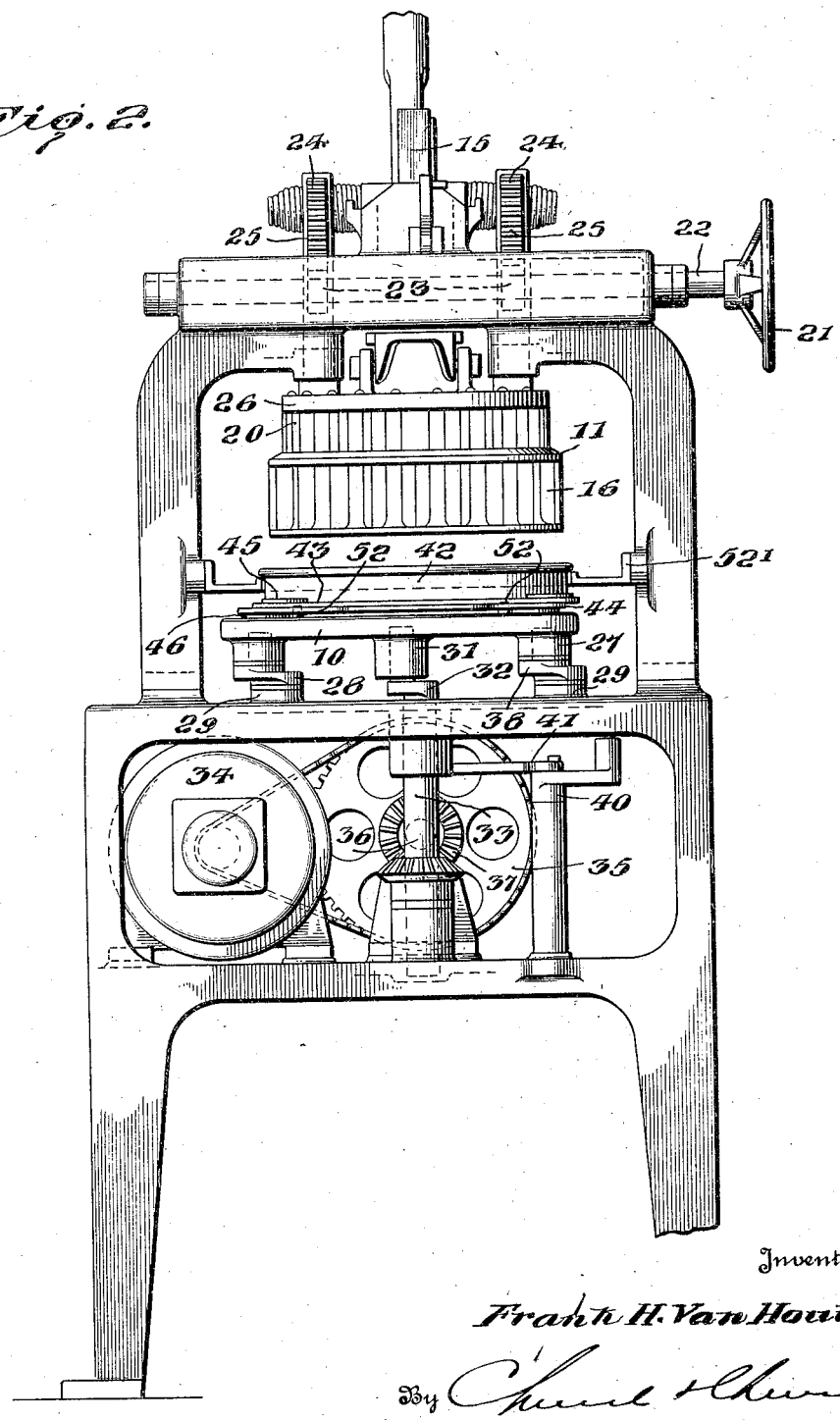

June 17, 1930.          F. H. VAN HOUTEN                1,764,586
                       DOUGH DIVIDER AND ROUNDER
                         Filed June 4, 1929         3 Sheets-Sheet 3
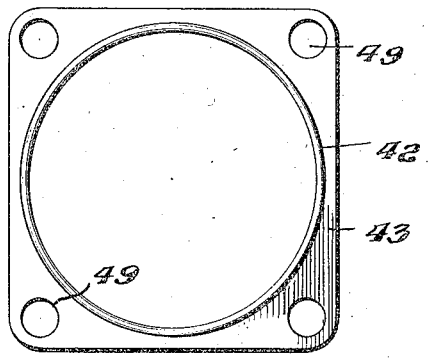
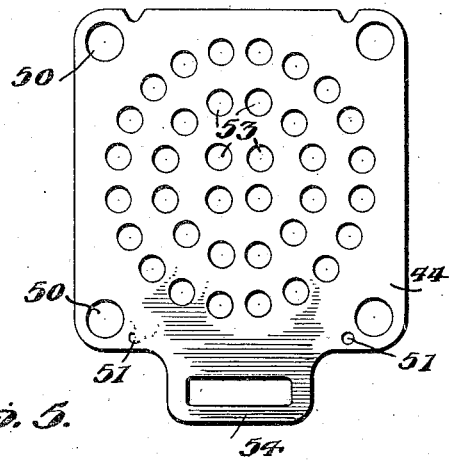
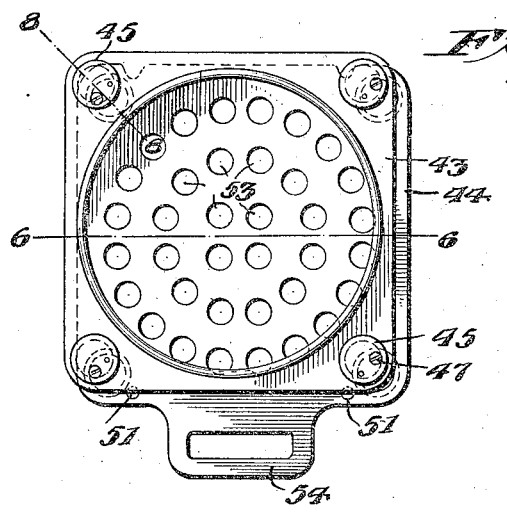
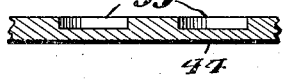
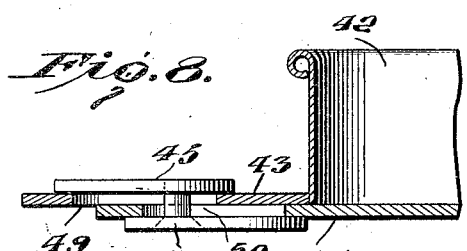
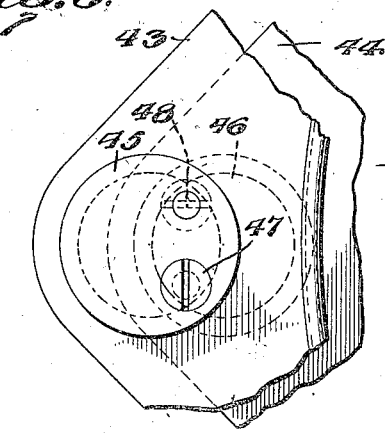
Inventor
Frank H. Van Houten.
By
Attorneys Patented June 17, 1930

1,764,586

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH DIVIDER AND ROUNDER

Application filed June 4, 1929. Serial No. 368,345.

This invention relates to dough handling apparatus, and particularly to what might be called a dough divider and rounder. Specifically, it relates to dough dividing machines of the type adapted to press and distribute successive masses of dough into suitable pans, the dough in each pan being divided into sub-divisions or portions of substantially uniform bulk after which the dough thus cut is rounded into balls of uniform size which, when baked, are usually referred to as rolls.

One object of the present invention is to provide a novel arrangement for rounding the individual portions of dough into the uniform sized balls.

More specifically, the invention contemplates a dough dividing machine having a pan support capable of being moved with a substantially gyratory motion, this motion being imparted to the bottom of a pan that may be inserted in and removed from the apparatus as a unit in so far as its bottom and rim portion is concerned. In carrying out these objects, there has also been devised a novel form of pan for use in this particular machine, the said pan consisting of a rim having attached thereto an upper plate and attached to the upper plate there is a bottom plate capable of moving with a gyratory motion relative to said rim. The machine proper is provided with means for holding said rim stationary, while said bottom plate is given a gyratory motion by the pan support of the machine. However, as has been said, the rim and two plates constituting the pan may be handled as a unit when being placed in or removed from the machine.

With these and other objects in view, the invention consists in certain novel details of construction and combinations and arrangements of parts, all as will hereinafter be more fully described and the novel features thereof pointed out in the appended claims.

In the accompanying drawings,

Fig. 2 is a front elevation with the several parts in the same position as Fig. 1.

Fig. 3 is a top plan view of the upper portion of the pan used in the present apparatus.

Fig. 4 is a plan view of the pan bottom.

Fig. 5 is a plan view of the top of the pan and pan bottom assembled.

Fig. 6 is a sectional view on the line 6—6 of Fig. 5.

Fig. 7 is an enlarged section of the pan bottom.

Fig. 8 is an enlarged detail sectional view on the line 8—8 of Fig. 5.

Fig. 9 is a plan view of that portion of the pan illustrated in Fig. 8.

Figure 1:
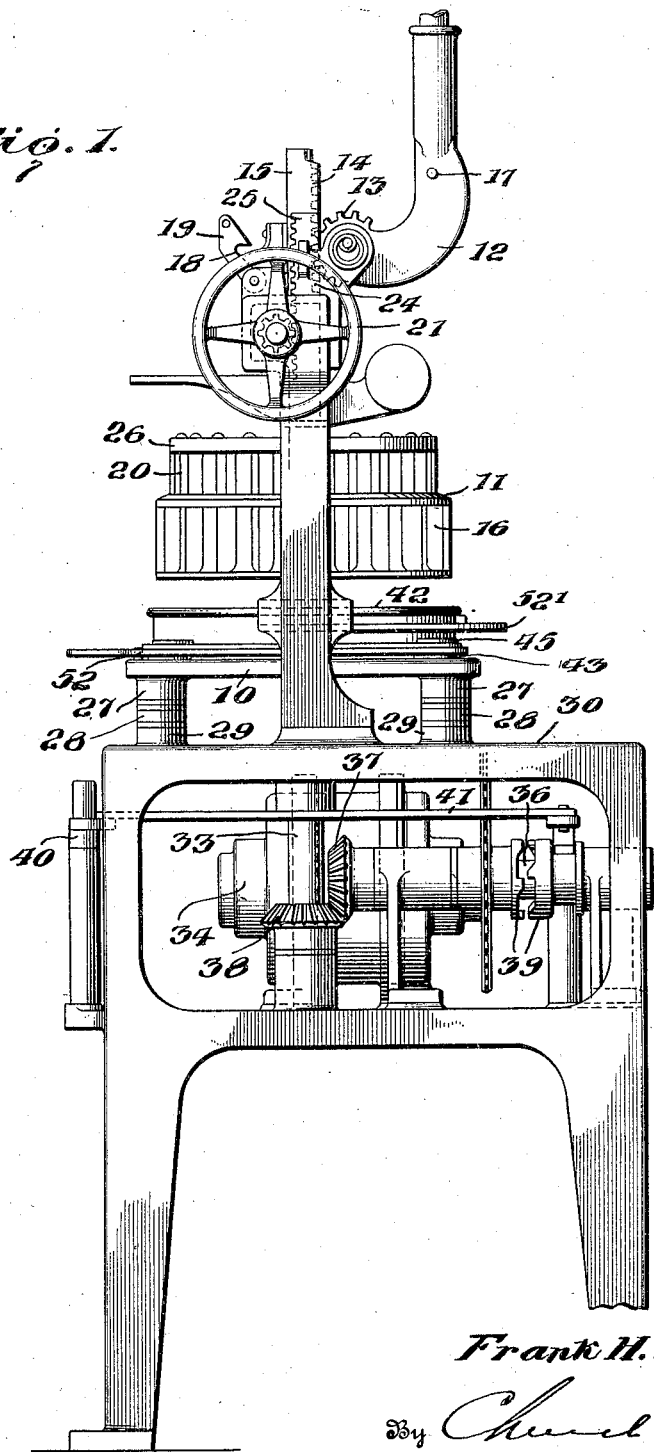
Figure 1 is a side elevation of the machine embodying the present improvements, the dividing head being illustrated in its uppermost position, and the pan for the dough in the position it occupies when filled with dough ready to be pressed down therein and cut.

The divider head may be of any desired construction and operated in any one of various ways, but the head shown in the present instance is substantially like that shown and described in applicant's Patent No. 1,177,835, dated April 4, 1916. As this portion of the apparatus forms no essential part of the present invention only a more or less general description thereof is deemed necessary in the ensuing specification. As shown in Figs. 1 and 2 the dough in the pan on the pan support 10 is adapted to be pressed down by a head 11 of the type shown in the patent just mentioned. Said head is lowered manually by depressing lever 12 having formed integrally therewith a quadrant 13 engaging a rack 14 on the stem 15 of said head. The knives 16 of the head cut the dough in the pan into substantially equal portions, the movement of lever 12 for accomplishing this being such that at the time the dough is cut, said lever has moved down to a point where pin 17 thereon engages a notch 18 in a locking lever 19 whereby the head is held firmly in its lowered position. As described in applicant's patent above referred to, the plungers 20 are also partially advanced during this downward movement of the knives, although, as explained in that patent, the latter part of the movement of lever 12 advances or depresses only the knives 16 for the purpose of severing the mass of dough. After the dough has thus been severed the plungers 20 are adapted to be elevated independently of the knives by a hand wheel 21 on a shaft 22 which carries gears 23 meshing with racks 24 formed on stems or guides 25 of the head 26 carrying said plungers. This retraction of the plungers is for the purpose of freeing the individual lumps of dough in the pockets formed by the numerous knives so that said lumps can be rolled or rounded by means such as hereinafter described.

For the purpose of rolling the dough in the pockets formed by the knives the pan is of special construction whereby the bottom thereof may have imparted thereto a gyratory motion by the pan support 10. For this purpose, pan support 10 is formed with a plurality, preferably four, of bearings 27, each adapted to receive the upper spindle of a crank 28 whose lower spindle is received in and revolves in a similar bearing 29 formed on the table 30 of the machine frame. Formed on the bottom surface of table 10, at the center thereof, is a bearing 31 which receives the upper spindle of a crank 32 constituting a part of the main shaft 33 and offset the same distance as the offset between the upper and lower spindles of the individual cranks 28. The cranks 28 are preferably located at each of the four corners of pan support 10 whereby the latter is firmly supported and is held in proper position while an oscillatory or gyratory motion is imparted thereto from main shaft 33 through crank 32. As will be apparent, this motion is imparted to table 10 upon rotation of shaft 33, said shaft being driven by a motor 34 mounted on the machine frame and connected to a sprocket 35 on a shaft 36 carying a bevel gear 37 engaging a similar gear 38 on said shaft 33. Sprocket 35 is normally loose on said shaft but is adapted to be connected thereby by clutch elements 39 that are operable by a lever 40 at the front of the machine and connected to one of said elements by a link 41 for actuating the same to engage and disengage the clutch.

In order to utilize this oscillatory or gyratory motion of the pan support for the purpose of rolling the individual lumps of dough held in the pockets formed by the knives 16 which are retained in their depressed position in the pan by the locking lever 19, said pan is formed with a bottom that may be secured to said pan support so as to move into unison therewith, while the rim of said pan remains stationary. Referring particularly to Figs. 3 to 9 the pan comprises a rim 42 attached to an upper plate 43 to which upper plate there is attached a lower plate 44 constituting the bottom of said pan. Preferably, bottom plate 44 is attached to plate 43 at each corner by eccentrically arranged disks 45, 46, engaging the upper and lower plates 43, 44, respectively. Each pair of disks 45, 46, are connected by screws 47, 48, extending through openings 49, 50, in plates 43, 44, respectively, the screws extending in opposite directions and being offset from one another a distance corresponding to the offset in the crank 32. It will be understood that the plates 43, 44, are not firmly clamped against one another by the disks 45, 46, but, on the other hand, their frictional engagement is such that plate 44 is free to move with respect to plate 43 and rim 42 when operated by the pan suport as will now be described. Referring particularly to Figs. 4 and 5, it will be seen that bottom plate 44 is formed with a pair of apertures 51 adapted to register with and receive pins 52 on the pan support 10. These pins engaging in apertures 51 secure the bottom of the pan to the pan support so that as the latter is oscillated or gyrated the bottom of the pan will move in unison therewith, but in order that this motion will not be imparted to the rim 42 of the pan the latter is held stationary, while on the pan support, by a semi-circular guide 52 on the machine frame. As shown in Figs. 4, 5 and 7 the bottom plate 44 has a multiplicity of depressions 53 therein, these depressions being arranged to coincide with the pockets or recesses in which the lumps of dough are held between the knives of the divider head. In other words, each of these cups or depressions 53 holds one of the individual sub-divisions or divided portions of the dough, and as the bottom of the pan is gyrated the lumps of dough are rolled around so as to be formed up into substantially spherical bodies.

In connection with the pan disclosed herein, it should be stated that while the special construction permits the bottom to move with respect to the rim, nevertheless, the rim and bottom or what is really the pan, may be handled as a unit in placing it in and removing it from the machine. This is important because by having the rim and bottom permanently associated with one another the dough can be placed in the pan and pressed into fairly good shape manually before the pan is placed under the presser head. This insures an even distribution of the dough throughout the pan so that the pieces or sub-divisions later formed from the one mass are of uniform size. Where the dough is not thus preliminarily pressed, but pressed only by the plungers, it has been found that the original mass placed in the pan is not always pressed into a true disk and consequently sub-divisions forming the outer surface of the sub-dividing disk are not equal in size to the sub-divisions formed from the inner portions of the disk. To facilitate handling of the pans the bottom plate 44 of each is formed with a handle portion 54 at one edge thereof.

What I claim is:

1. In a dough divider and rounder, the combination of a pan support, means for imparting a gyratory motion to said support, a pan adapted to be placed on said support, said pan comprising relatively movable rim and bottom portions attached to one another, and means for transferring said gyratory motion to one of said pan portions while the other is held stationary.

2. In a dough divider and rounder, the combination of a pan support, means for imparting a gyratory motion to said support, a pan adapted to be placed on said support, said pan comprising a rim and bottom portion, attached to said rim but movable with respect thereto, means for holding said rim stationary, and means for transferring the gyratory motion of said support to said pan bottom.

3. In a dough divider and rounder, a pan comprising a rim and a bottom attached to said rim, and means for imparting a gyratory motion to said pan bottom independently of said rim.

4. In a dough divider and rounder, a pan comprising a rim and a bottom attached thereto, said bottom being movable relatively to said rim, means for holding said rim stationary and means for imparting a gyratory motion to said pan bottom.

5. In a dough divider and rounder, a pan comprising a rim and a bottom, said bottom attached to said rim having a plurality of depressions therein each adapted to receive a sub-division of a mass of dough divided in said pan, and means for moving said pan bottom with a gyratory motion relatively to said rim.

6. In a dough divider and rounder apparatus, a pan comprising a rim and bottom attached to said rim, means for dividing a mass of dough in the pan into a plurality of sub-divisions, and means for moving said pan bottom relatively to said rim with a gyratory motion, said rim and pan bottom being insertable in and removable from said apparatus as a unit.

7. In a dough divider and rounder, the combination of a pan support, means for imparting a gyratory motion to said support, a pan adapted to be placed on said support comprising a rim portion and a bottom attached to said rim portion, means for attaching said bottom to said pan support, and means for holding said rim portion stationary.

8. A pan for a dough divider and rounder, comprising a rim portion and a bottom portion connected to and carried by said rim portion but free to be moved with a substantially gyratory motion relatively to said rim.

9. A pan for a dough divider and rounder comprising a rim and connected top plate, and a bottom plate attached to said top plate but free to move relatively thereto.

10. A pan for a dough divider and rounder comprising a rim and top plate fixedly attached thereto, a bottom plate attached to said top plate and constituting the bottom of said pan, and a pair of eccentrically connected disks for securing said bottom and top plates together, said bottom plate being movable relatively to said rim with a gyratory motion.

11. A pan for a dough divider and rounder comprising a rim and a bottom plate attached to said rim and forming the bottom of said pan, said bottom plate having a multiplicity of depressions therein each adapted to receive an individual lump of dough, and said bottom being movable relatively to said rim with a gyratory motion.

12. A pan for a dough divider and rounder comprising a rim, a bottom plate forming the bottom of said pan, and connections between said plate and rim whereby they may be handled as a unit, said plate having a plurality of depressions therein each adapted to receive an individual lump of dough and said bottom plate being movable relatively to said rim wtih a substantially gyratory motion.

FRANK H. VAN HOUTEN.